UNITED STATES PATENT OFFICE.

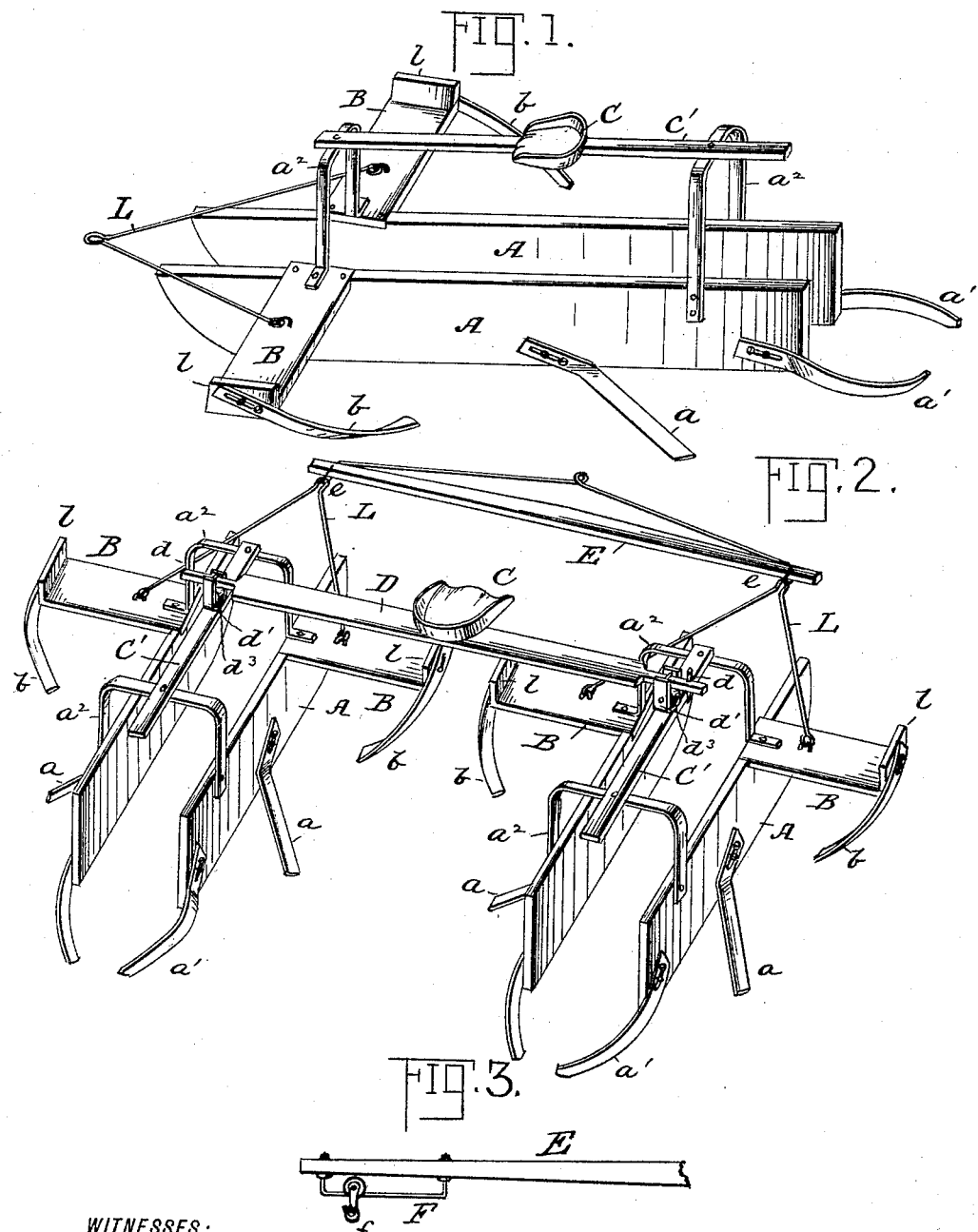

WILLIAM R. PETTIJOHN, OF HOYT, KANSAS.

LISTER-CULTIVATOR.

SPECIFICATION forming part of Letters Patent No. 440,498, dated November 11, 1890.

Application filed September 3, 1890. Serial No. 363,815. (No model.)

*To all whom it may concern:*

Be it known that I, WILLIAM R. PETTIJOHN, a citizen of the United States, residing at Hoyt, in the county of Jackson and State of Kansas, have invented certain new and useful Improvements in Lister-Cultivators; and I do hereby declare the following to be a full, clear, and exact description of the invention, such as will enable others skilled in the art to which it appertains to make and use the same.

This invention relates to that class of agricultural implements which are commonly designated as "lister-cultivators," and has for its object to improve the general construction of this class of machines, whereby the work will be performed in a more satisfactory and thorough manner.

The improvement consists of the novel features and the peculiar construction and combination of the parts, which hereinafter will be more fully described and claimed, and which are shown in the annexed drawings, in which—

Figure 1 is a perspective view of a pair of lister cultivators coupled together and adapted to act upon two rows at the same time. Fig. 2 is a perspective view of a single cultivator embodying my invention. Fig. 3 is a perspective view of a modified form of draft-bar.

Similar letters refer to corresponding parts in the several figures of the drawings.

The machine comprises the runners or side pieces A A, which are placed in parallel position, being spaced the proper distance apart and held in a fixed relative position by the arches $a^2\ a^2$, one near each end of the runners or side pieces A A. The cutters $a'\ a'$, which are secured to the rear ends of the runners A A, curve outward in opposite directions near their front ends, or that portion directly in the rear of the runners, and have their rear ends curved in or toward each other gradually. The rear ends of the cutters are spaced a sufficient distance apart to prevent injurious contact thereof with the plants. The lower rear corners of the cutters $a'\ a'$ are sheaved off to give clearance and to avoid sharp corners coming in contact with the plants. These cutters $a'\ a'$ also have a gradual pitch or slope from front to rear to obtain the best possible results. The cutters $a\ a$ are secured to the sides of the runners A A and extend outwardly, upwardly, and rearwardly. In cross-section these cutters incline upwardly from their front or cutting edge. The arms B B, projected from the sides of the runners A A near their front ends, have blocks $l\ l$ on their upper sides close to the outer ends of the said arms. The cutters $b\ b$ are fastened to these blocks $l\ l$ and curve inward and upward from front to rear. These cutters $b\ b$ dip or slope from front to rear. A line drawn so as to pass through the rear ends of the cutters $a$ and $b$ will be approximately parallel with the runners, thus showing that the ground over which the arms B B pass is cultivated. The draft is applied to the bail L, which is connected at its inner ends to the arms B B. The seat C is secured to the seat-bar C', which is fastened at its ends in any well-known manner to the crest of the arches $a^2\ a^2$.

Fig. 2 shows two cultivators, such as illustrated in Fig. 1, coupled together and held apart by devices which will permit them to adapt themselves to the inequalities or deviations in the parallelism of two rows. Loops $d'\ d'$ are provided on the bars C', and these loops have rollers $d^3\ a^3$. The connecting-bar D, having its ends reduced to form shoulders, has the said reduced ends passed through the loops $d'$, and pins $d$ being passed through said ends at a proper distance from the loops to admit of a limited movement of the cultivators to or from each other in adapting themselves to the lines of the rows. The draft-bar E is connected by short chains $e\ e$ with the bails L L, the chains $e\ e$ permitting the cultivators to approach or recede from one another. In Fig. 3 the draft-bar E is shown provided on its rear with loops F and with hooks $f$, which are adapted to travel on the straight portions of the said loops, the hooks being provided with pulleys which relieve the friction on the said loops. The hooks $ff$ will engage directly with the bails L L.

Having thus described my invention, what I claim, and desire to secure by Letters Patent, is—

1. The herein shown and described cultivator, comprised of the runners A A, arranged in parallel position and having the arms B B projected laterally therefrom near their front ends, the arches $a^2\ a^2$, secured at their ends to the runners and holding them in a fixed relative position, the seat-bar C', provided with seat C, fastened at its ends to the arches $a^2 a^2$, the cutters $b\ b$, secured to the outer ends of the arms and curving inward and upward and sloping from front to rear, cutters $a\ a$, secured to the runners A A in the rear of arms B B and projecting outwardly, rearwardly, and upwardly relatively to the said runners A A, and the cutters $a'\ a'$, secured to the rear ends of the runners and projecting rearwardly therefrom, and curving outwardly and gradually recurving and sloping from front to rear, substantially as set forth.

2. The combination, with two cultivators, each composed of the runners A A, arranged in parallel position and provided with the cutting devices, the arches $a^2 a^2$, connecting the runners, and the bars C', joining the arches, of the loops $d'\ d'$, secured to the bars C' C', the rollers $d^3 d^3$, provided in the loops, the seat-bar having its ends reduced to form shoulders and having the said reduced ends passed through the loops, pins passed through the said reduced ends of the seat-bar to limit the movement of the cultivators between the pins and the said shoulders, and the draft-bars loosely connected with the said cultivators, substantially as set forth.

In testimony whereof I affix my signature in presence of two witnesses.

WILLIAM R. PETTIJOHN.

Witnesses:
 J. I. FLEMING,
 LONA FLEMING.